United States Patent
Yabuta et al.

(10) Patent No.: US 12,533,617 B2
(45) Date of Patent: Jan. 27, 2026

(54) FILTER HOLDING DEVICE, DEVELOPING DEVICE, PROCESS CARTRIDGE, AND IMAGE FORMING APPARATUS

(71) Applicants: Yuta Yabuta, Kanagawa (JP); Kazuki Yogosawa, Tokyo (JP); Tatsuya Kubo, Kanagawa (JP); Takuya Suganuma, Kanagawa (JP); Hotaru Hashikawa, Kanagawa (JP); Yoshihiro Fujiwara, Kanagawa (JP)

(72) Inventors: Yuta Yabuta, Kanagawa (JP); Kazuki Yogosawa, Tokyo (JP); Tatsuya Kubo, Kanagawa (JP); Takuya Suganuma, Kanagawa (JP); Hotaru Hashikawa, Kanagawa (JP); Yoshihiro Fujiwara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 383 days.

(21) Appl. No.: 18/025,406

(22) PCT Filed: Sep. 22, 2021

(86) PCT No.: PCT/IB2021/058620
§ 371 (c)(1),
(2) Date: Mar. 9, 2023

(87) PCT Pub. No.: WO2022/074490
PCT Pub. Date: Apr. 14, 2022

(65) Prior Publication Data
US 2023/0330582 A1    Oct. 19, 2023

(30) Foreign Application Priority Data

Oct. 7, 2020    (JP) ................................. 2020-169669
Oct. 7, 2020    (JP) ................................. 2020-169685
Mar. 25, 2021   (JP) ................................. 2021-051281

(51) Int. Cl.
*B01D 46/10*    (2006.01)
*G03G 21/18*    (2006.01)

(52) U.S. Cl.
CPC ......... *B01D 46/10* (2013.01); *G03G 21/1814* (2013.01); *B01D 2275/10* (2013.01)

(58) Field of Classification Search
CPC ................ B01D 46/10; B01D 2275/10; B01D 2275/305; B01D 46/0005;
(Continued)

(56) References Cited

U.S. PATENT DOCUMENTS

| | | |
|---|---|---|
| 3,570,224 A | 3/1971 | Clemens |
| 4,188,197 A | 2/1980 | Amberkar et al. |

(Continued)

FOREIGN PATENT DOCUMENTS

| | | |
|---|---|---|
| CN | 201156169 Y | 11/2008 |
| CN | 104238311 A | 12/2014 |

(Continued)

OTHER PUBLICATIONS

English language machine translation of JP6872125, 11 pages, No Date.*

(Continued)

*Primary Examiner* — Pranav N Patel
(74) *Attorney, Agent, or Firm* — XSENSUS LLP

(57) ABSTRACT

A filter holding device includes an opening portion and a filter. The opening portion communicates an inside of the filter holding device with an outside of the filter holding device, and has a rim that extends in a communication direction from the inside of the filter holding device toward the outside of the filter holding device. The filter is disposed in the opening portion, and has a first side and a second side. The first side faces the inside of the filter holding device. The second side faces the outside of the filter holding device. The (Continued)

filter has a larger weight density per unit volume at the second side facing the outside of the filter holding device than at the first side facing the inside of the filter holding device in a state in which the filter is disposed in the opening portion.

22 Claims, 7 Drawing Sheets

(58) Field of Classification Search
CPC ...... B01D 2239/0654; B01D 2275/205; B01D 2275/307; B01D 46/64; B01D 2201/188; G03G 21/1814; G03G 15/0898; G03G 15/0896; G03G 21/206; G03G 21/0052
See application file for complete search history.

(56) References Cited

U.S. PATENT DOCUMENTS

| | | | |
|---|---|---|---|
| 4,236,901 | A | 12/1980 | Kato et al. |
| 2002/0102111 | A1 | 8/2002 | Yoshiki |
| 2007/0065171 | A1 | 3/2007 | Koshimura et al. |
| 2010/0196218 | A1 | 8/2010 | Schildermans et al. |
| 2014/0270838 | A1 | 9/2014 | Yoshizawa et al. |
| 2014/0376951 | A1 | 12/2014 | Ogawa et al. |
| 2018/0120737 | A1 | 5/2018 | Okamoto et al. |
| 2018/0253030 | A1 | 9/2018 | Sako et al. |
| 2018/0348698 | A1 | 12/2018 | Tamaki et al. |
| 2020/0103824 | A1 | 4/2020 | Oshikawa et al. |
| 2020/0301313 | A1 | 9/2020 | Suganuma et al. |
| 2022/0107605 | A1 | 4/2022 | Hashikawa et al. |

FOREIGN PATENT DOCUMENTS

| | | |
|---|---|---|
| CN | 111693215 A | 9/2020 |
| JP | S61-181513 A | 8/1986 |
| JP | 9-311553 | 12/1997 |
| JP | H10-161490 A | 6/1998 |
| JP | H10-198152 A | 7/1998 |
| JP | 10-268717 | 10/1998 |
| JP | 2003-084634 | 3/2003 |
| JP | 2004-272122 A | 9/2004 |
| JP | 2005-242195 A | 9/2005 |
| JP | 2005-266004 A | 9/2005 |
| JP | 2005-346035 | 12/2005 |
| JP | 2008-151980 | 7/2008 |
| JP | 2011-215567 | 10/2011 |
| JP | 2014-132322 | 7/2014 |
| JP | 2014-178347 | 9/2014 |
| JP | 2015-004773 | 1/2015 |
| JP | 2015-068911 | 4/2015 |
| JP | 2017-040748 A | 2/2017 |
| JP | 2017-211412 A | 11/2017 |
| JP | 2018-072619 | 5/2018 |
| JP | 2018-092047 | 6/2018 |
| JP | 2018-197835 | 12/2018 |
| JP | 6872125 B2 * | 5/2021 |
| JP | 2022-061616 | 4/2022 |

OTHER PUBLICATIONS

Office Action issued Jan. 6, 2025 in Chinese Patent Application No. 202180068540.1, 9 pages.
International Search Report issued on Nov. 12, 2021 in PCT/IB2021/058620 filed on Sep. 22, 2021, 13 pages.
Office Action issued Jun. 24, 2024 in Japanese Patent Application No. 2020-169685, 8 pages.
Office Action issued Aug. 26, 2024 in Japanese Patent Application No. 2021-051281, 10 pages.
Office Action issued Jun. 18, 2025 in Chinese Patent Application No. 202180068540.1 with machine English translation thereof.

* cited by examiner

FILTER HOLDING DEVICE, DEVELOPING DEVICE, PROCESS CARTRIDGE, AND IMAGE FORMING APPARATUS

CROSS-REFERENCE TO RELATED APPLICATIONS

The present application is based on PCT filing PCT/IB2021/058620, filed Sep. 22, 2021, which claims priority to Japanese Patent Application Nos. 2020-169669, filed on Oct. 7, 2020; 2020-169685, filed on Oct. 7, 2020; and 2021-051281, filed on Mar. 25, 2021, the entire contents of each are incorporated herein by its reference.

TECHNICAL FIELD

Embodiments of the present disclosure relate to a filter holding device in which a filter is disposed in an opening portion, a developing device that contains toner, and a process cartridge, an image forming apparatus including the filter.

BACKGROUND ART

Conventionally, in a developing device disposed in an image forming apparatus such as a copying machine or a printer, a technology that a filter is disposed in an opening portion formed in the upper part of a developing case for the purpose of preventing toner scattering due to an increase of an internal pressure in the developing device is known (e.g., Japanese Unexamined Patent Application Publication No. 2014-178347). Specifically, in the developing device in Japanese Unexamined Patent Application Publication No. 2014-178347, even if the internal pressure inside the developing device is about to rise, the air inside the developing device is discharged to the outside of the developing device through the opening portion in which the filter is disposed, so that the increase of the internal pressure is restricted. Then, when the air inside the developing device is discharged to the outside of the developing device, even if the toner floating in the developing device is about to be discharged to the outside of the developing device together with the air, the toner is collected by the filter. Accordingly, the scattering of toner to the outside of the device is restricted.

CITATION LIST

Patent Literature

[PTL 1]
Japanese Unexamined Patent Application Publication No. 2014-178347

SUMMARY OF INVENTION

Technical Problem

In such a conventional technology, there is a possibility that air (discharge object) in the device leaks from lateral sides of the filter together with toner (collection object). In such a case, the function of the filter is not fully exerted, and the toner (collection object) is scattered outside the device. The present disclosure is made to solve the above-described problem and provide a filter holder, a developing device, a process cartridge, and an image forming apparatus that reduce the defect that a discharge object in the device is discharged to the outside of the device together with a collection object.

Solution to Problem

According to an embodiment of the present disclosure, a filter holding device includes an opening portion and a filter. The opening portion communicates an inside of the filter holding device with an outside of the filter holding device, and has a rim that extends in a communication direction from the inside of the filter holding device toward the outside of the filter holding device. The filter is disposed in the opening portion and has a first side and a second side. The first side faces the inside of the filter holding device. The second side faces the outside of the filter holding device. The filter has a larger weight density per unit volume at the second side than at the first side in a state in which the filter is disposed in the opening portion.

Advantageous Effects of Invention

According to the present disclosure, there is provided a filter holding device, a developing device, a process cartridge, and an image forming apparatus that reduce the defect that a discharge object in the device is discharged to the outside of the device together with a collection object.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
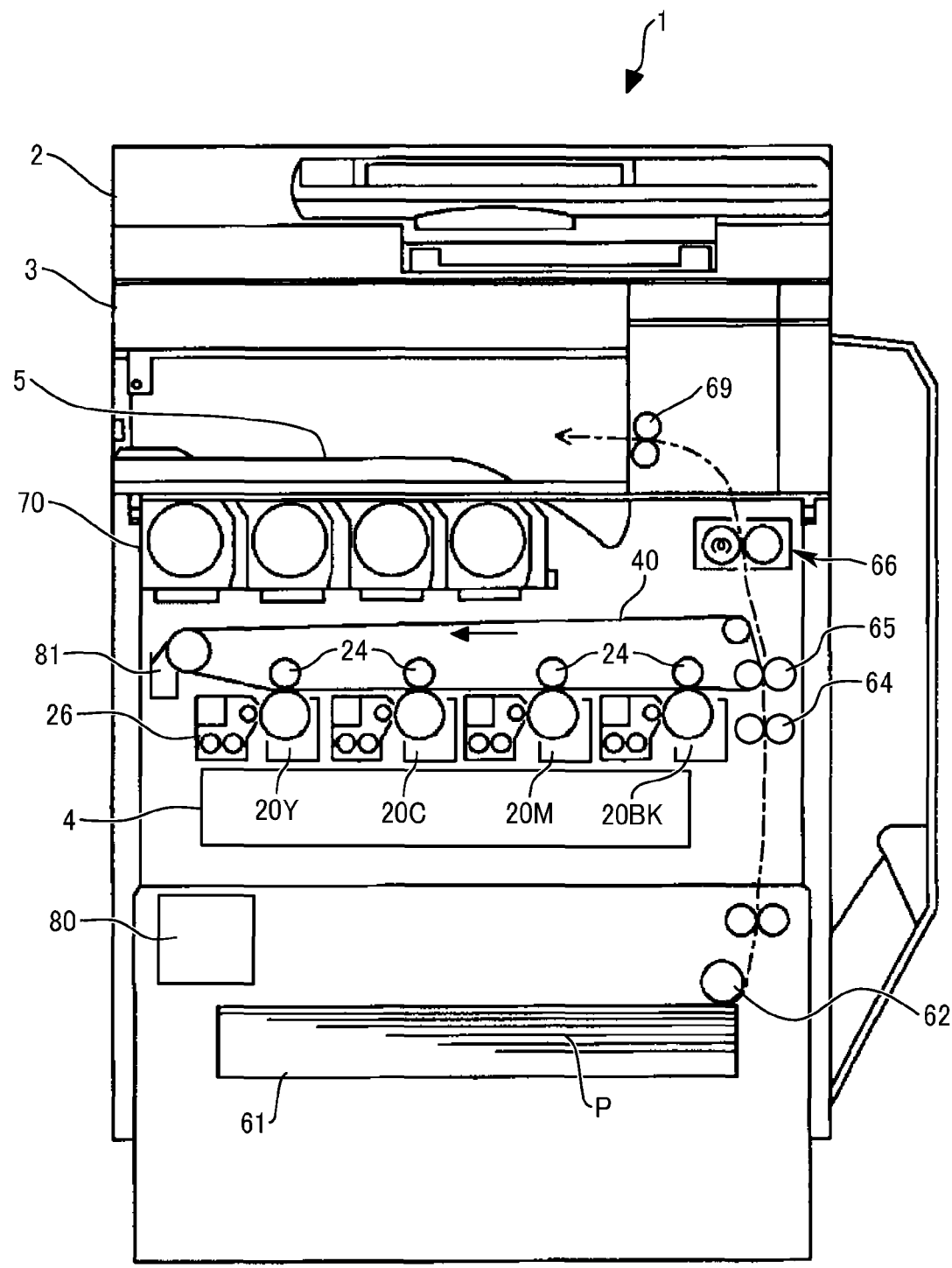
FIG. 1 is a schematic view illustrating an overall configuration of an image forming apparatus according to an embodiment of the present disclosure.

The terminology used herein is for the purpose of describing particular embodiments only and is not intended to be limiting of the present invention. As used herein, the singular forms "a," "an," and "the" are intended to include the plural forms as well, unless the context clearly indicates otherwise. In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

With reference to the drawings, embodiments of the present disclosure are described below. Note that identical reference numerals are assigned to identical components or equivalents and a description of those components is simplified or omitted.

An overall configuration and operation of an image forming apparatus 1 according to an embodiment of the present disclosure are described below with reference to FIG. 1. The image forming apparatus 1 according to the present embodiment is a tandem multicolor image forming apparatus in which process cartridges 20Y, 20M, 20C, and 20BK are arranged in parallel to each other, facing an intermediate transfer belt 40. A developing device 26 (see FIG. 2A) as a filter holding device (a device with a filter) is disposed to face a photoconductor drum 21 in each of the process cartridges 20Y, 20M, 20C, and 20BK as illustrated in FIG. 1.

In FIG. 1, the image forming apparatus 1, which is a main body of a color copier in the present embodiment, includes a document conveyor 2, a scanner 3 as a document reading device, and a writing device 4 as an exposure device. The document conveyor 2 conveys a document to the scanner 3. The scanner 3 reads image data of the document. The writing device 4 emits a laser beam based on input image data. In addition, the image forming apparatus 1 includes the process cartridges 20Y, 20M, 20C, and 20BK to form yellow, magenta, cyan and black toner images on respective surfaces of the photoconductor drums 21 (see FIG. 2A), respectively, and an intermediate transfer belt 40 on which the yellow, magenta, cyan and black toner images are transferred and superimposed. The image forming apparatus 1 further includes a sheet feeder 61 to accommodate sheets P such as paper sheets, a secondary transfer roller 65 to transfer the toner image formed on the intermediate transfer belt 40 onto the sheet P, and a fixing device 66 to fix an unfixed toner image on the sheet P. The image forming apparatus 1 still further includes toner containers 70 to supply toners of respective colors to the developing devices 26 of the plurality of process cartridges 20Y, 20M, 20C, and 20BK and a waste-toner container 80 to collect toner collected by cleaning devices 23 (see FIG. 2) or untransferred toner collected by an intermediate transfer belt cleaner 81.

Figure 2A:
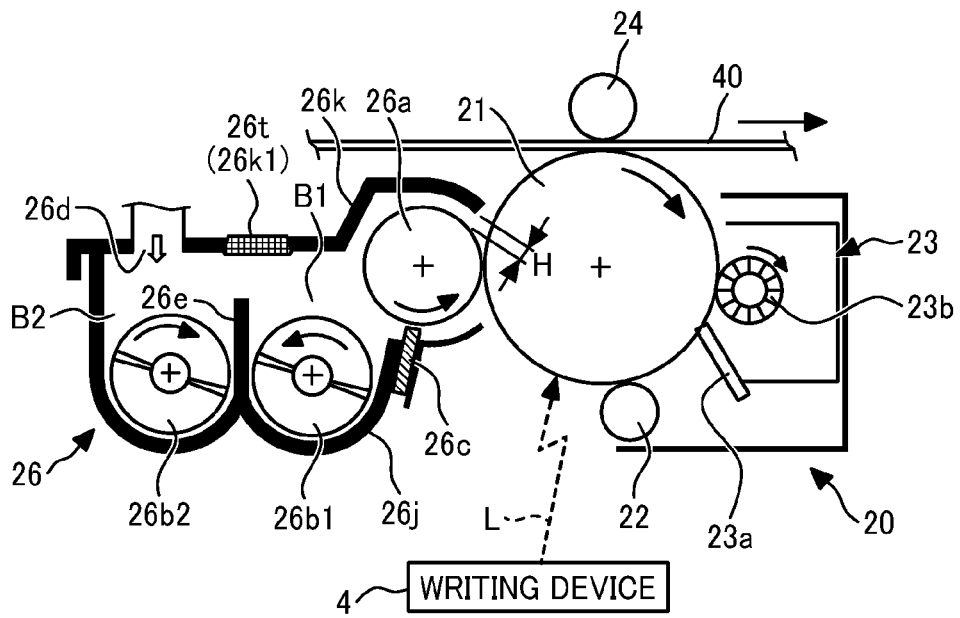
FIG. 2A is a schematic cross-sectional diagram illustrating an image forming unit according to an embodiment of the present disclosure.
Figure 2B:
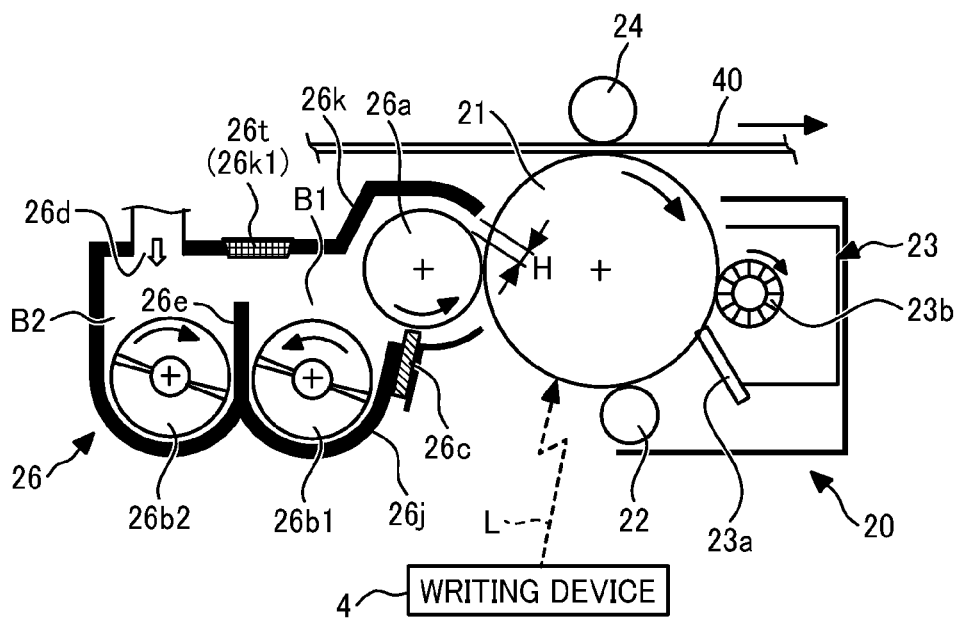
FIG. 2B is a schematic cross-sectional diagram illustrating an image forming unit according to another embodiment of the present disclosure.

Each of the process cartridges 20Y, 20M, 20C, and 20BK includes the photoconductor drum 21 as an image bearer, a charging device 22, and the cleaning device 23, which are united as a single unit as illustrated in FIGS. 2A and 2B. Each of the process cartridges 20Y, 20M, 20C, and 20BK, which is expendable, is replaced with a new one when depleted in a main body of the image forming apparatus 1. The developing device 26 is disposed facing the photoconductor drum 21 in each of the process cartridges 20Y, 20M, 20C, and 20BK. Each of the developing devices 26, which is expendable, is replaced with a new one when depleted in a main body of the image forming apparatus 1. An operator can independently perform the installation and the removal operation of the developing device 26 with respect to the main body of the image forming apparatus 1 and the installation and the removal operation of the process cartridges 20Y, 20M, 20C, and 20BK with respect to the main body of the image forming apparatus 1, as different operations. In the process cartridges 20Y, 20M, 20C, and 20BK, toner images (yellow, magenta, cyan, and black) are formed on the respective photoconductor drums 21 as the image bearers.

A description is provided below of operations of the image forming apparatus 1 to form a normal color toner image. A conveyance roller of the document conveyor 2 conveys a document from a document table onto an exposure glass of the scanner 3. The scanner 3 optically scans image data for the document on the exposure glass. The yellow, magenta, cyan, and black image data are transmitted to the writing device 4. The writing device 4 irradiates the photoconductor drums 21 (see FIGS. 2A and 2B) of the corresponding process cartridges 20Y, 20M, 20C, and 20BK with laser beams (as exposure light) L based on the yellow, magenta, cyan, and black image data, respectively.

Each of the four photoconductor drums 21 rotates clockwise in FIG. 1 (in a direction indicated by an arrow in FIG. 2A). The surface of the photoconductor drum 21 is uniformly charged at a position where the photoconductor drum 21 faces the charging device 22 that is a charging roller (a charging process). Thus, the surface of the photoconductor drum 21 is charged to a certain potential. When the charged surface of the photoconductor drum 21 reaches a position to receive the laser beam L emitted from the writing device 4, an electrostatic latent image based on the image data is formed on the surface of the photoconductor drum 21 (an exposure process).

The laser beam L corresponding to the yellow image data is irradiated to the surface of photoconductor drum 21 in the process cartridge 20Y, which is the first from the left in FIG. 1 among the four process cartridges 20Y, 20M, 20C, and 20BK. A polygon mirror that rotates at high velocity deflects the laser beam L for yellow so that the laser beam L scans the surface of the photoconductor drum 21 along the rotation axis direction of the photoconductor drum 21 (i.e., the main scanning direction). Thus, an electrostatic latent image corresponding to the yellow component is formed on the photoconductor drum 21 charged by the charging device 22. Similarly, the laser beam L corresponding to the cyan image data is irradiated to the surface of the photoconductor drum 21 in the second process cartridge 20C from the left in FIG. 1, thus forming an electrostatic latent image for cyan on the surface of the photoconductor drum 21. The laser beam L corresponding to the magenta image data is irradiated to the surface of the photoconductor drum 21 in the third process cartridge 20M from the left in FIG. 1, thus forming an electrostatic latent image for magenta on the surface of the photoconductor drum 21. The laser beam L corresponding to the black image data is irradiated to the surface of the photoconductor drum 21 in the fourth process cartridge 20BK from the left in FIG. 1, thus forming an electrostatic latent image for black on the photoconductor drum 21.

Then, the surface of the photoconductor drum 21 having the electrostatic latent image reaches a position opposite the developing device 26. The developing device 26 supplies toner of each color onto the surface of the photoconductor drum 21 and develops the electrostatic latent image on the photoconductor drum 21 into a toner image (a development process). Subsequently, the surface of the photoconductor drum 21 after the development process reaches a position facing the intermediate transfer belt 40. The primary transfer rollers 24 are disposed at the positions where the photoconductor drums 21 face the intermediate transfer belt 40 and in contact with an inner circumferential surface of the intermediate transfer belt 40, respectively. At the positions of the primary transfer rollers 24, the toner images on the photoconductor drums 21 are sequentially transferred to and superimposed on the intermediate transfer belt 40, forming a multicolor toner image thereon (a primary transfer process).

After the primary transfer process, the surface of the photoconductor drum 21 reaches a position opposite the cleaning device 23. The cleaning device 23 collects untransferred toner remaining on the photoconductor drum 21 (a cleaning process). The untransferred toner collected in the cleaning device 23 passes through a waste-toner conveyance path and is collected as waste toner in the waste-toner container 80. Subsequently, a residual potential of the surface of the photoconductor drum 21 is removed at a position opposite the discharger, and a series of image forming processes performed on the photoconductor drum 21 is completed.

Meanwhile, the surface of the intermediate transfer belt 40, onto which the single-color toner images on the photoconductor drums 21 are superimposed, moves in the direction indicated by arrow in FIG. 1 and reaches a position opposite the secondary transfer roller 65. The secondary transfer roller 65 secondarily transfers the multicolor toner image on the intermediate transfer belt 40 onto the sheet P (a secondary transfer process). After the secondary transfer process, the surface of the intermediate transfer belt 40 reaches a position opposite the intermediate transfer belt cleaner 81. The intermediate transfer belt cleaner 81 collects the untransferred toner on the intermediate transfer belt 40 to complete a series of transfer processes on the intermediate transfer belt 40. The untransferred toner collected in the intermediate transfer belt cleaner 81 passes through the waste-toner conveyance path and is collected as waste toner in the waste-toner container 80.

The sheet P is conveyed from the sheet feeder 61 to the position of the secondary transfer roller 65 via a registration roller pair 64. Specifically, a feed roller 62 feeds the sheet P from top of multiple sheets P accommodated in the sheet feeder 61. The sheet P is conveyed to a registration roller pair 64 through a sheet conveyance path. The sheet P that has reached the registration roller pair 64 is conveyed toward the position of the secondary transfer roller 65, timed to coincide with the arrival of the multicolor toner image on the intermediate transfer belt 40.

Subsequently, the sheet P, onto which the multicolor image is transferred, is conveyed to the fixing device 66. The fixing device 66 includes a fixing roller and a pressure roller pressing against each other. In a nip between the fixing roller and the pressure roller, the multicolor toner image is fixed on the sheet P. After the fixing process, an output roller pair 69 ejects the sheet P as an output image to the main body of the image forming apparatus 1. The ejected sheet P is stacked on an output tray 5 to complete a series of image forming processes.

Next, with reference to FIGS. 2A and 3, image forming units of the image forming apparatus are described in detail below. The four image forming units disposed in the main body of the image forming apparatus 1 (see FIG. 1) have a similar configuration except the color of the toner used in the image forming processes. Therefore, parts of the image forming unit such as the process cartridge and the developing device are illustrated without suffixes Y, M, C, and BK, which denote the color of the toner, in the drawings.

As illustrated in FIG. 2A, the process cartridge 20 mainly includes the photoconductor drum 21 as the image bearer, the charging device 22, and the cleaning device 23, which are stored in a case of the process cartridge 20 as a single unit. The photoconductor drum 21 is an organic photoconductor designed to be charged with a negative polarity and includes a photosensitive layer formed on a drum-shaped conductive support. The charging device 22 is the charging roller including a conductive core and an elastic layer of moderate resistivity overlaid on the conductive core. A power supply applies a predetermined voltage to the charging device 22 that is the charging roller. The charging device 22 uniformly charges the surface of the photoconductor drum 21 opposite the charging device 22. The cleaning device 23 includes a cleaning blade 23a and a cleaning roller 23b that contact the photoconductor drum 21. For example, the cleaning blade 23a is made of rubber, such as urethane rubber, and contacts the surface of the photoconductor drum 21 at a predetermined angle with a predetermined pressure. The cleaning roller 23b is a brush roller in which brush bristles are provided around a core.

Figure 3:
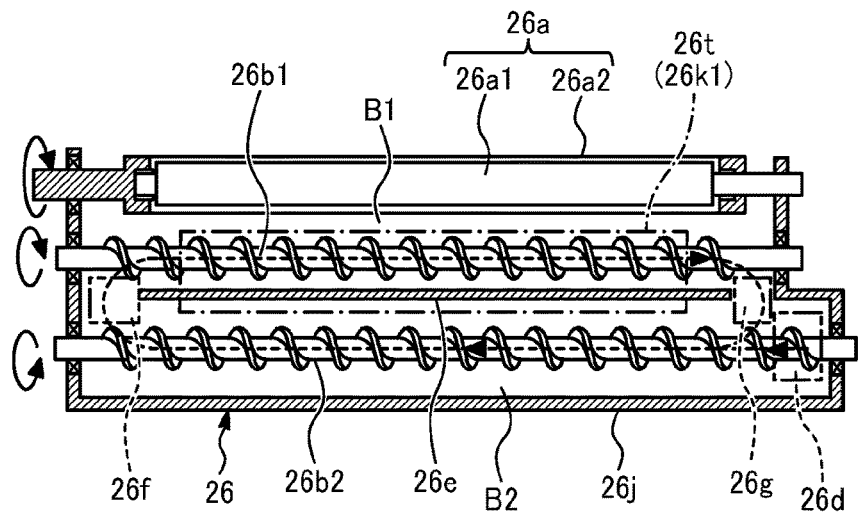
FIG. 3 is a schematic diagram illustrating a configuration of a developing device in a longitudinal direction thereof.

As illustrated in FIGS. 2A and 3, the developing device 26 mainly includes a developing roller 26a (serving as a developer bearer), a first conveying screw 26b1 (serving as a first conveyor) facing the developing roller 26a, a partition 26e, a second conveying screw 26b2 (serving as a second conveyor) facing the first conveying screw 26b1 via the partition 26e, and a doctor blade 26c (serving as a developer regulator) facing the developing roller 26a to regulate the amount of developer borne on the developing roller 26a. The developing device 26 in the present embodiment also functions as a filter holding device that holds the filter 26t (toner filter), which is described in detail later.

The developing device 26 stores a two-component developer including carrier and toner. The developing roller 26a is opposed to the photoconductor drum 21 with a small gap, thereby forming a developing range. As illustrated in FIG. 3, the developing roller 26a includes stationary magnets 26a1 inside and a sleeve 26a2 that rotates around the magnets 26a01. The magnets 26a1 generate multiple poles (magnetic poles) around the outer circumferential surface of the developing roller 26a.

The first conveying screw 26b1 and the second conveying screw 26b2 as conveyors convey the developer stored in the developing device 26 in the longitudinal direction of the developing device 26, thereby establishing a circulation path indicated by the dashed arrow in FIG. 3. That is, the first conveying screw 26b1 establishes a first conveyance path B1, and the second conveying screw 26b2 establishes a second conveyance path B2. The circulation path of the developer includes the first conveyance path B1 and the second conveyance path B2. The partition 26e is an inner wall and separates the first conveyance path B1 from the second conveyance path B2, and the first conveyance path B1 and the second conveyance path B2 communicate with each other via first communication openings 26f and second communication openings 26g disposed at both ends of the first conveyance path B1 and the second conveyance path B2 in the longitudinal direction. Specifically, with reference to FIG. 3, in a conveyance direction of the developer, an upstream end of the first conveyance path B1 communicates with a downstream end of the second conveyance path B2 via the first communication opening 26f. Additionally, in the conveyance direction of the developer, a downstream end of the first conveyance path B1 communicates with an upstream end of the second conveyance path B2 via the second communication opening 26g. That is, the partition 26e is disposed along the circulation path except both longitudinal ends of the circulation path. The first conveying screw 26b1 in the first conveyance path B1 is disposed opposite the developing roller 26a. The second conveying screw 26b2 in the second conveyance path B2 is disposed opposite the first conveying screw 26b1 in the first conveyance path B1 via the partition 26e. The first conveying screw 26b1 supplies developer to the developing roller 26a and collects the developer separated from the developing roller 26a after the development process, while conveying the developer in the longitudinal direction of the developing device 26. The second conveying screw 26b2 stirs and mixes the developer conveyed from the first conveyance path B1 after the development process with a fresh toner supplied from a toner supply inlet 26d, while conveying the developer and the fresh toner in the longitudinal direction of the developing device 26. In the present embodiment, the first conveying screw 26b1 and the second conveying screw 26b2 are horizontally arranged in parallel. Each of the first conveying screw 26b1 and the second conveying screw 26b2 includes a shaft and a screw blade wound around the shaft.

In the present embodiment, the developing device 26 includes two developing cases (an upper developing case 26k and a lower developing case 26j) that can be divided into upper and lower parts as a housing, and is covered by the two developing cases. The developing roller 26a, the first conveying screw 26b1, and the second conveying screw 26b2 are rotatably held in the lower developing case 26j. The doctor blade 26c is also held in the lower developing case 26j. Further, in the upper developing case 26k, the filter 26t is disposed in an opening portion 26k1 as described later. The upper developing case 26k is detachably attached to the lower developing case 26j in which the developing roller 26a, the first conveying screw 26b1, the second conveying screw 26b2, and the doctor blade 26c are disposed by fastening screws or the like.

The image forming processes, described above, are described focusing on the development process in further detail below with reference to FIGS. 2A and 3. The developing roller 26a rotates in the direction indicated by an arrow in FIG. 2A. As illustrated in FIGS. 2A and 3, the first conveying screw 26b1 and the second conveying screw 26b2 are disposed facing each other with the partition 26e interposed therebetween and rotate in directions indicated by arrows in FIGS. 2A and 3. Toner is supplied from the toner container 70 to the toner supply inlet 26d (serving as an inlet opening) via a toner supply path. As the first conveying screw 26b1 and the second conveying screw 26b2 rotate in the respective directions in FIG. 2A, the developer stored in the developing device 26 circulates together with the supplied toner in the longitudinal direction of the developing device 26 (the direction indicated by the dashed arrow in FIG. 3) while being stirred and mixed with the supplied toner. The toner is charged by friction with carrier in the developer and electrostatically attracted to carrier. Then, the toner is scooped up on the developing roller 26a together with carrier by a developer scooping pole generated on the developing roller 26a. The developer borne on the developing roller 26a is conveyed in the counterclockwise direction indicated by the arrow in FIG. 2A to a position opposite the doctor blade 26c. The doctor blade 26c adjusts the amount of the developer on the developing roller 26a to a proper amount at the position. Subsequently, the rotation of the sleeve 26a2 conveys the developer to the developing area in which the developing roller 26 faces the photoconductor drum 21. The toner in the developer is attracted to the electrostatic latent image formed on the photoconductor drum 21 due to the effect of an electric field generated in the developing area. Thereafter, as the sleeve 26a2 rotates, the developer remaining on the developing roller 26a reaches above the first conveyance path B1 and is separated from the developing roller 26a. The electric field in the developing area is formed by a specified voltage (in other words, a development bias) applied to the developing roller 26a by a development power supply and a surface potential (in other words, a latent image potential) formed on the photoconductor drum 21 in the charging process and the exposure process.

The toner in the toner container 70 is supplied from the toner supply inlet 26d to the developing device 26 via a toner replenishing path as the toner in the developing device 26 is consumed. The toner consumption in the developing device 26 is detected by a toner concentration sensor that magnetically detects a toner concentration in the developer (i.e., a ratio of toner to the developer) in the developing device 26. The toner supply inlet 26d is disposed above an end of the second conveying screw 26b2 (the second conveyance path B2) in the longitudinal direction (the left and right direction in FIG. 3).

The configuration and operation of the developing device 26 as the filter holding device according to the present embodiment are described in further detail below. As illustrated in, e.g., FIGS. 2A and 4A, the developing device 26 in the present embodiment functions as the filter holding device in which the filter 26t is disposed in the opening portion 26k1 that communicates inside of the filter holding device with outside of the filter holding device. Specifically, the opening portion 26k1 (ventilation path) penetrating inside and outside is formed on the ceiling of the upper developing case 26k (housing) of the developing device 26. The filter 26t is disposed so as to close the opening portion 26k1. The filter 26t collects toner as powder and ventilates the developing device 26. In other words, the opening portion 26*k*1 (ventilation path) for sending air from inside to outside of the developing device 26 is formed in the upper developing case 26*k*. The filter 26*t* is disposed in the opening portion 26*k*1 as a mounting portion. The filter 26*t* is made of a screen having a mesh size that is smaller than the particle diameter of the toner T or the carrier C and thus allows only air to pass through. In the present embodiment, the opening portion 26*k*1 is opened in a substantially rectangular shape. The filter 26*t*, which is in a single state, is formed in a substantially rectangular shape.

A gap H (casing gap) between the developing roller 26*a* and the upper developing case 26*k* on a downstream side of the development area is set to be within the range of 0.6 mm to 1.0 mm. Note that, if the casing gap H is smaller than 0.6 mm, the developer carried on the developing roller 26*a* after the development process is not smoothly conveyed through the casing gap H between the developing roller 26*a* and the upper developing case 26*k*. Accordingly, the developer is likely to leak to the outside of the developing device 26. On the other hand, when the casing gap H is larger than 1.0 mm, the developer carried on the developing roller 26*a* is not likely to be in sliding contact with the inner surface of the upper developing case 26*k*, and a suction airflow toward the inside of the developing device 26 due to a pump action is hardly generated. As a result, toner scattering from the developing device 26, which is scattering of toner to the periphery of the development area, is likely to occur. Therefore, with the casing gap H kept within an appropriate range, leakage of the developer and toner scattering can be reduced. Further, the internal pressure of the developing device 26 is likely to increase due to the suction airflow through the casing gap H described above, and if the internal pressure increases, toner scattering may occur from gaps of the developing device 26. On the other hand, in the present embodiment, since the opening portion 26*k*1 covered by the filter 26*t* is provided to collect the toner T, only air is ventilated while preventing the toner T from scattering to the outside. As a result, the increase of the internal pressure of the developing device 26 is restrained. That is, this configuration prevents toner scattering caused by the increase of the internal pressure of the developing device 26.

Figure 4A:
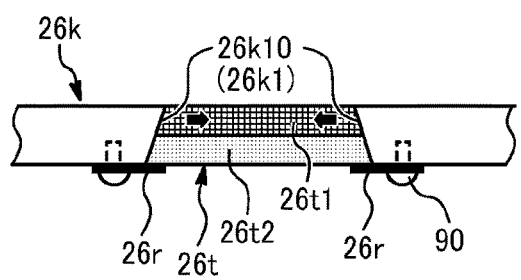
FIG. 4A is an enlarged cross-sectional diagram illustrating a state in which a filter is disposed in an opening portion of the developing device.
Figure 4B:
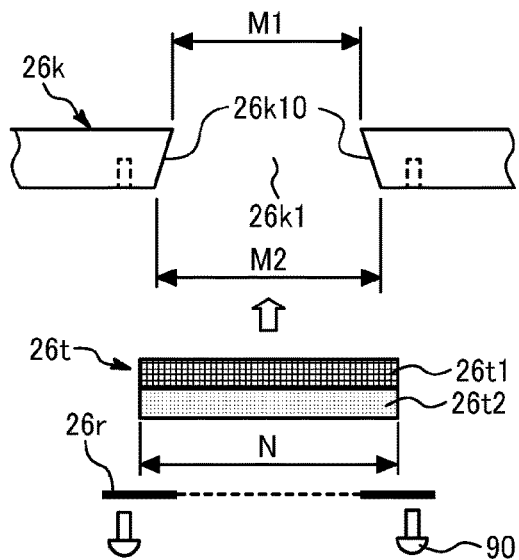
FIG. 4B is an enlarged cross-sectional diagram illustrating a state before the filter is disposed in the opening portion of the developing device.

In the present embodiment, when the filter 26*t* is in a single state (state in FIG. 4B) in which the filter 26*t* is not disposed in the opening portion 26*k*1, the filter 26*t* has a lower weight density per unit volume at a first side (the lower side in FIG. 4B) than at a second side (the upper side in FIG. 4B). That is, when the filter 26*t* is in a single state in which an external force does not act on the filter 26*t*, the weight density per unit volume is not uniform in the filter 26*t*. A portion having a low weight density and a portion having a high weight density are formed in a ventilation direction (communication direction). In other words, the filter 26*t* has a gradient of weight density per unit volume.

More specifically, in the present embodiment, the filter 26*t* has a two-layer structure. When the filter 26*t* is in a single state in which the filter 26*t* is not disposed in the opening portion 26*k*1, a low-density portion 26*t*2 having a low weight density per unit volume is formed at the first side (the lower side in FIG. 4B) of the filter 26*t* and a high-density portion 26*t*1 having a high weight density per unit volume is formed at the second side (the upper side in FIG. 4B) of the filter 26*t*. That is, in the filter 26*t*, the low-density portion 26*t*2 at the first side (upstream side in the ventilation direction) has coarse meshes and is relatively fluffy, while the high-density portion 26*t*1 at the second side (downstream side in the ventilation direction) has meshes in a denser state. Accordingly, when the filter 26*t* according to the present embodiment is in the single state, the toner collecting ability of the high-density portion 26*t*1 is higher than the toner collecting ability of the low-density portion 26*t*2.

In the developing device 26 of the present embodiment, the opening portion 26*k*1 has a rim 26*k*10 (wall) extending in a communication direction (ventilation direction, which is the vertical direction in FIGS. 2A and 4A) from the inside of the developing device 26 to the outside of the developing device 26. The filter 26*t* has the opening portion 26*k*1 such that the first side (having the low weight density) is located facing the inside of the developing device 26 (the lower side in FIG. 4A) and the second side (having the high weight density) is located facing the outside of the developing device 26 (the upper side in FIG. 4A). At least a part of the filter 26*t* disposed in the opening portion 26*k*1 contacts the rim 26*k*10 and is compressed in directions intersecting the communication direction (i.e., directions of black arrows in FIG. 4A). Specifically, the filter 26*t* is disposed in the opening portion 26*k*1 in a state where the filter 26*t* is compressed at the second side (the downstream side in the ventilation direction) by the rim 26*k*10 in the directions indicated by the black arrows (intersection directions) in FIG. 4A. More specifically, as illustrated in FIG. 4A, the filter 26*t* is disposed in the opening portion 26*k*1 in a state where the high-density portion 26*t*1 is compressed by the rim 26*k*10 in the directions indicated by the black arrows (intersection directions) in FIG. 4A. That is, in FIG. 4A, the state in which the filter 26*t* (high-density portion 26*t*1) is compressed and disposed (fitted) in the opening portion 26*k*1 is illustrated two-dimensionally. However, in fact, the filter 26*t* (high-density portion 26*t*1) is compressed from all quarters by contact with the substantially rectangular rim 26*k*10.

More specifically, as illustrated in FIG. 4B, a length N of the filter 26*t* in an intersection direction intersecting the communication direction is set to be larger than any one of opening widths M1 and M2 (lengths in the intersection direction) of the opening portion 26*k*1 in the single state (N>M2>M1). As illustrated in FIG. 4A, the filter 26*t* is disposed in close contact with the opening portion 26*k*1 in a state of being compressed according to the shape of the opening portion 26*k*1. Specifically, the high-density portion 26*t*1 of the filter 26*t* disposed in the opening portion 26*k*1 is compressed at a high compression rate.

In the developing device 26 of the present embodiment, since the filter 26*t* is disposed in close contact with the opening portion 26*k*1, the defect that air (discharge object) leaks from lateral sides of the filter 26*t* (between the filter 26*t* and the opening portion 26*k*1) together with toner (collection object) is reduced. Accordingly, the function of the filter 26*t* described above is fully performed, and the defect that the toner (collection object) is scattered to the outside of the developing device 26 is reduced. In particular, since the filter 26*t* has a portion having a high weight-density per unit volume and easily enhances adhesion, at least the adhesion of the opening portion 26*k*1 in the portion is ensured. Thus, the above-described effect can be obtained. The filter 26*t* is formed such that the weight density increases from the upstream side to the downstream side in the ventilation direction (communication direction). Such a configuration facilitates formation of an air flow from the inside to the outside of the developing device 26. Accordingly, the increase of the internal pressure in the developing device 26 can be efficiently restrained. The overall toner collection performance of the filter 26*t* can be enhanced, and the filter 26*t* is less likely to be clogged. In the state where the filter 26*t* is disposed in the opening portion 26*k*1 (in actual use state), a portion having a high weight density per unit volume (high-density portion 26*t*1) is compressed to further increase the weight density. The magnitude correlation of the weight density between the high-density portion 26*t*1 and the low-density portion 26*t*2 described above is maintained. In the developing device 26 of the present embodiment, the rim 26*k*10 in the opening portion 26*k*1 is formed such that the opening area of the opening portion 26*k*1 continuously increases from the outside to the inside of the developing device 26 (from the upper side to the lower side in FIG. 4A). That is, with respect to a discharge direction (ventilation direction) in which air is discharged to the outside of the developing device 26, the rim 26*k*10 is inclined (an inclined surface is formed in the rim 26*k*10) so as to move away from the central portion of the opening from the downstream side to the upstream side in the discharge direction. Such a configuration of the rim 26*k*10 allows the high-density portion 26*t*1 that easily enhances the adhesion with the rim 26*k*10 to be compressed at a higher compression rate. Thus, the adhesion of the filter 26*t* to the opening portion 26*k*1 can be enhanced. With the above-described configuration, the filter 26*t* can be easily assembled and removed from one side with respect to the upper developing case 26*k* in the state of being removed from the developing device 26. Further, the upper end of the inclination of the rim 26*k*10 functions as a restricting portion for preventing the filter 26*t* from coming off to the outside of the developing device 26.

In the developing device 26 of the present embodiment, stoppers 26*r* are detachably attached to contact the first side of the filter 26*t* (a portion having the low weight density, i.e., the low-density portion 26*t*2) facing the inside of the developing device 26 so that the filter 26*t* does not fall out from the opening portion 26*k*1 (rim 26*k*10) into the developing device 26.

Specifically, when the filter 26*t* is attached, as illustrated in FIG. 4B, the filter 26*t* is moved from below the upper developing case 26*k* (opening portion 26*k*1) in the direction of the white arrow in FIG. 4B. As illustrated in FIG. 4A, the filter 26*t* is fitted into the opening portion 26*k*1. In order to prevent a defect that the filter 26*t* comes off downward, the stoppers 26*r* are fixed (screw-fastened) to the upper developing case 26*k* by screws 90 so as to hold the filter 26*t* from below. Then, the upper developing case 26*k* in which the filter 26*t* (and the stoppers 26*r*) is attached is installed in the developing device 26 (lower developing case 26*j*). In the present embodiment, a plate-shaped member having an opening inside is used as the stopper 26*r*. The stopper 26*r* is not limited to this as long as the function of the filter 26*t* is not impaired. As the stopper 26*r*, for example, a mesh-shaped member having a coarse mesh may also be used. Further, in the present embodiment, the substantially rectangular-parallelepiped filter 26*t* is used. The shape of the filter 26*t* is not limited to this. For example, the filter 26*t* may be formed in a quadrangular-pyramid shape so as to match with the shape of the rim 26*k*10 having the inclined surface.

Figure 5A:
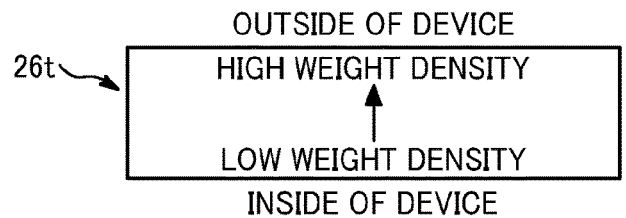
FIG. 5A is a schematic cross-sectional diagram illustrating a filter according to an embodiment of the present disclosure.
Figure 5B:
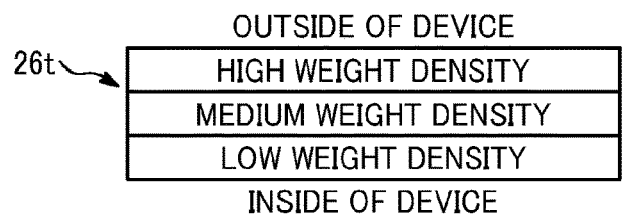
FIG. 5B is a schematic cross-sectional diagram illustrating a filter according to another embodiment of the present disclosure.

In the present embodiment, as the filter 26*t*, a filter having a two-layer structure including the high-density portion 26*t*1 and the low-density portion 26*t*2 is used. On the other hand, as illustrated in FIG. 5A, a filter 26*t* having a single-layer structure can be used. In the single-layer structure, the weight density per unit volume of the filter 26*t* gradually increases in the direction of the arrow in FIG. 5A from the first side (facing the inside of the developing device 26) to the second side (facing the outside of the developing device 26) in a single state in which the filter 26*t* is not disposed in the opening portion 26*k*1. Such a filter 26*t* is formed such that the weight density per unit volume gradually increases along the ventilation direction (exhaust direction). Specifically, the filter 26*t* illustrated in FIG. 5A has a coarse and relatively fluffy state at the first side, and is denser toward the second side. Further, as illustrated in FIG. 5B, a filter 26*t* having a multiple-layer structure (three layers or more) can be used. In the multiple-layer structure, the weight density per unit volume of the filter 26*t* gradually increases from the first side (facing the inside of the developing device 26) to the second side (facing the outside of the developing device 26) in a single state in which the filter 26*t* is not disposed in the opening portion 26*k*1. In such a filter 26*t*, a plurality of layers are formed such that the weight density per unit volume gradually increases along the ventilation direction (exhaust direction). Specifically, the filter 26*t* illustrated in FIG. 5B has a coarse and relatively fluffy state at the first side, and is denser and is laminated toward the second side.

First Variation

Figure 6:
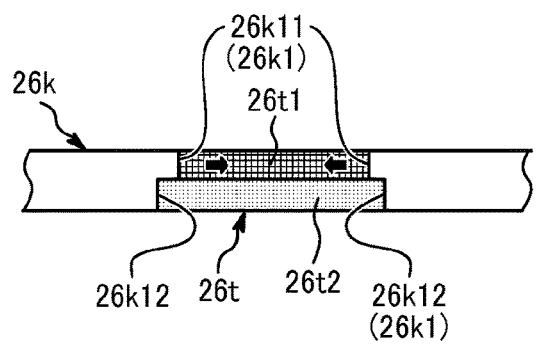
FIG. 6 is an enlarged diagram illustrating a state in which a filter is disposed in an opening portion of a developing device as a first variation.

As illustrated in FIG. 6, in a developing device 26 in a first variation, rims 26*k*11 and 26*k*12 of an opening portion 26*k*1 have the opening area of the opening portion 26*k*1 gradually increasing from the outside of the developing device 26 toward the inside of the developing device 26. Specifically, the opening portion 26*k*1 having a two-stage structure includes a first rim 26*k*11 having a small opening area formed on the outside of the developing device 26 (upper side in FIG. 6) and a second rim 26*k*12 having a large opening area on the inside of the developing device 26 (lower side in FIG. 6). In the first variation, a high-density portion 26*t*1 of a filter 26*t* is fitted to the first rim 26*k*11. A low-density portion 26*t*2 contacts the second rim 26*k*12 and is compressed in the direction of the black arrow in FIG. 6. Even such a configuration can reduce a defect that air in the developing device 26 is discharged to the outside of the developing device 26 together with toner without passing through the filter 26*t*. As in the first variation, even when the rims 26*k*11 and 26*k*12 are formed so that the opening area stepwise decreases, similar to the case where the opening area of the rim 26*k*10 is continuously decreased as illustrated in FIG. 4A, an attaching and detaching operability of the upper developing case 26*k* to the opening portion 26*k*1 is improved. The step of the rims 26*k*11 and 26*k*12 prevents the filter 26*t* from coming off the device.

Second Variation

Figure 7:
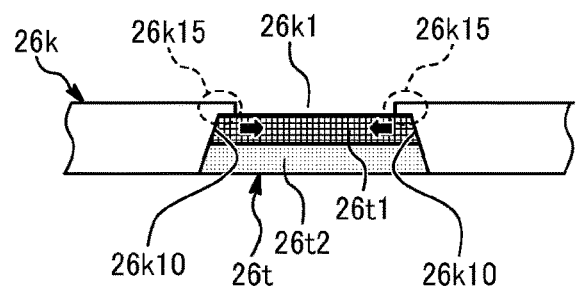
FIG. 7 is an enlarged diagram illustrating a state in which a filter is disposed in an opening portion of a developing device as a second variation.

As illustrated in FIG. 7, a developing device 26 (see FIG. 2A) in a second variation includes a restricting portion 26*k*15 that restricts the filter 26*t* from coming out of the developing device 26 from the opening portion 26*k*1 (rim 26*k*10). Specifically, the restricting portion 26*k*15 that protrudes in the direction of narrowing the opening is formed above the opening portion 26*k*1 (rim 26*k*10) in the upper developing case 26*k*. The restricting portion 26*k*15 is formed such that the second side of the filter 26*t* (a portion having a high weight density, i.e., a high-density portion 26*t*1) can be contacted. Disposing the restricting portion 26*k*15 in this way can prevent a defect that the filter 26*t* disposed in the opening portion 26*k*1 comes out of the developing device 26. Further, the position of the filter 26*t* in the opening portion 26*k*1 in the vertical direction can be easily determined.

Third Variation

Figure 8:
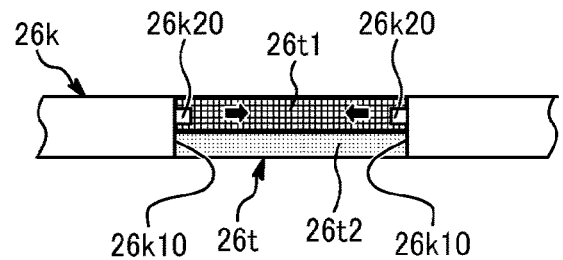
FIG. 8 is an enlarged diagram illustrating a state in which a filter is disposed in an opening portion of a developing device as a third variation.

As illustrated in FIG. 8, in a developing device 26 (see FIG. 2A) in a third variation, a rim 26*k*10 of an opening portion 26*k*1 includes a protruding portion 26*k*20 is formed so as to compress a filter 26*t* at the second side (a portion having a high weight density, i.e., a high-density portion 26*t*1) in the directions of black arrows in FIG. 8 (the directions intersecting the communication direction). Specifically, the rim 26*k*10 (opening portion 26*k*1) in an upper developing case 26*k* does not have an inclined surface unlike the upper developing case 26*k* in FIG. 4A. The rim 26*k*10 has the protruding portion 26*k*20 (convex portion) that protrudes in the direction of narrowing the opening at a position above the central portion in the communication direction. In particular, the protruding portion 26*k*20 is formed over the entire circumference of the substantially rectangular rim 26*k*10. Even with such a configuration, the high-density portion 26*t*1 of the filter 26*t* disposed in the opening portion 26*k*1 is compressed by the protruding portion 26*k*20. Thus, a defect that air in the developing device 26 is discharged to the outside of the developing device 26 together with toner without passing through the filter 26*t* can be reduced.

Fourth Variation

Figure 9:
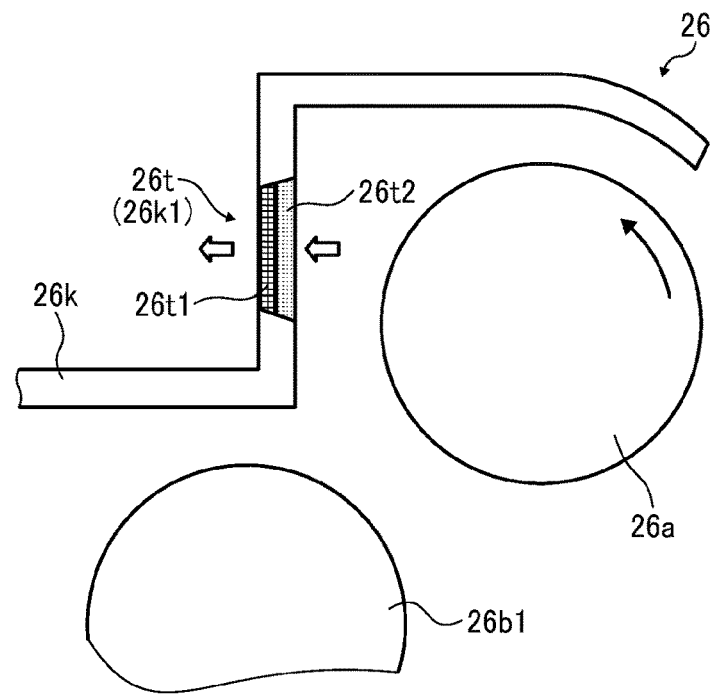
FIG. 9 is an enlarged diagram illustrating a main part of a developing device as a fourth variation.

As illustrated in FIG. 9, in a developing device 26 in a fourth variation, the communication direction of an opening portion 26*k*1 is not the vertical direction as illustrated in FIGS. 4A and 4B but the substantially horizontal direction (in the direction of the white arrows in FIG. 9). Specifically, the upper developing case 26*k* is formed with a portion extending in a substantially vertical direction at a position facing a developing roller 26*a*. The upper developing case 26*k* includes the opening portion 26*k*1 formed in the portion. The opening portion 26*k*1 includes a rim 26*k*10 extending in a substantially horizontal direction. A filter 26*t* is disposed (fitted) on the rim 26*k*10. The filter 26*t* includes a low-density portion 26*t*2 and a high-density portion 26*t*1. The low-density portion 26*t*2 at the first side of the filter 26*t* is located facing the inside of the developing device 26 (right side in FIG. 9). The high-density portion 26*t*1 at the second side of the filter 26*t* is located facing the outside of the developing device 26 (left side in FIG. 9). Further, also in the fourth variation, the rim 26*k*10 has an inclination, and the high-density portion 26*t*1 is compressed by the rim 26*k*10 in the directions intersecting the communication direction. Even such a configuration can reduce a defect that air in the developing device 26 is discharged to the outside of the developing device 26 together with toner without passing through the filter 26*t*.

Fifth Variation

Figure 10:
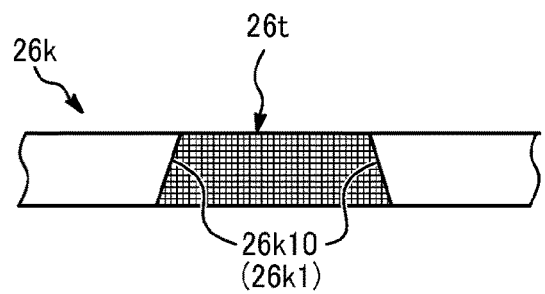
FIG. 10 is an enlarged diagram illustrating a state in which a filter is disposed in an opening portion of a developing device as a fifth variation.

As illustrated in FIG. 10, a rim 26*k*10 of a developing device 26 (see FIG. 9) in a fifth variation is formed in a tapered shape such that the opening area of an opening portion 26*k*1 continuously decreases from the inside of the developing device 26 to the outside of the developing device 26. Further, in the fifth variation, a filter 26*t* is not a two-layer structure of the high-density portion 26*t*1 and the low-density portion 26*t*2 but a one-layer structure in which the weight density per unit volume is formed substantially uniformly. In the case of the rim 26*k*10 (opening portion 26*k*1) configured in this way, even if the filter 26*t* is not only in the two-layer structure but also in the one-layer structure, the filter 26*t* is formed such that the weight density per unit volume on the outside of the developing device 26 is larger than the weight density per unit volume on the inside of the developing device 26 in a state in which the filter 26*t* is disposed in the opening portion 26*k*1. That is, in the filter 26*t* disposed in the opening portion 26*k*1, the degree of compression on the outside of the developing device 26 is larger than degree of compression on the inside of the developing device 26. Accordingly, the defect that air (discharge object) in the developing device 26 leaks together with toner (collection object) from the lateral sides of the filter 26*t* (between the filter 26*t* and the opening portion 26*k*1) is reduced. In the present embodiment, since the filter 26*t* is disposed in close contact with the opening portion 26*k*1, the defect that air (discharge object) leaks from the lateral sides of the filter 26*t* (between the filter 26*t* and the opening portion 26*k*1) together toner (collection object) is further reduced. As a result, the function of the filter 26*t* is fully performed, and the defect that toner (collection object) is scattered to the outside of the developing device 26 is reduced. The filter 26*t* is disposed such that the weight density increases from the upstream side to the downstream side in the ventilation direction (communication direction), thus facilitates formation of the air flow from the inside to the outside of the developing device 26. Accordingly, the increase of the internal pressure in the developing device 26 can be efficiently restrained. The overall toner collection property of the filter 26*t* can be enhanced, and the filter 26*t* is less likely to be clogged. Note that, in the fifth variation, the rim 26*k*10 can also be formed in a stepped manner so that the opening area of the opening portion 26*k*1 gradually decreases from the inside of the developing device 26 to the outside of the developing device 26.

In the embodiments from here, an opening portion is larger on the outside than on the inside of the developing case. With such a configuration, the following effects can be attained. A filter 26*t* can be easily replaced without opening the developing case (an upper developing case 26*k* and a lower developing case 26*j*) during a maintenance of the filter replacement (even if the upper developing case 26*k* is not detachably attached on the lower developing case 26*j*). Even if the developing cases (the upper developing case 26*k* and the lower developing case 26*j*) are fixed to each other with an adhesive or the like and the upper developing case 26*k* is not be attached to or detached from a developing case 26*j*, the filter 26*t* can be easily replaced. When compressing a rectangular filter, a part with low weight density (small repulsive force) is compressed more, and a part with high weight density (large repulsive force) can be less compressed. A defect such as bending or variation of the casing gap H due to the repulsive force during compression can be reduced. Since the area of the portion having a high weight density and being likely to be clogged can be increased, the product life of the filter 26*t* can be extended.

Figure 11A:
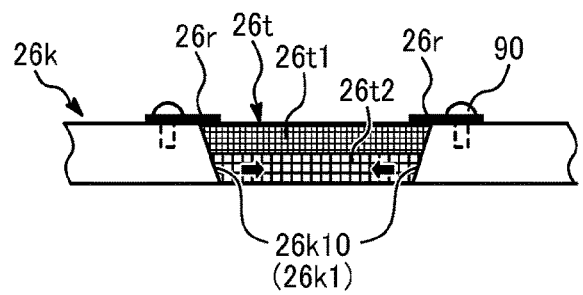
FIG. 11A is an enlarged diagram illustrating a state in which a filter is disposed in an opening portion of a developing device according to another embodiment.

In a developing device 26 according to the present embodiment, an opening portion 26*k*1 has a rim 26*k*10 (wall) extending in the communication direction (ventilation direction, which is the vertical direction in FIGS. 2B and 11A) from the inside of the developing device 26 to the outside of the developing device 26. A filter 26*t* disposed in the opening portion 26*k*1 such that the first side (having a low weight density) is located facing the inside of the developing device 26 (lower side in FIG. 11A), and the second side (having a high weight density) is located facing the outside of the developing device 26 (upper side in FIG. 11A). The filter 26*t* disposed in the opening portion 26*k*1 contacts the rim 26*k*10 and is compressed at the first side (having the low weight density) in directions intersecting the communication direction (directions of black arrows in FIG. 11A). Specifically, as illustrated in FIG. 11A, the filter 26*t* is disposed in the opening portion 26*k*1 in a state where a low-density portion 26*t*2 is compressed by the rim 26*k*10 in the directions indicated by the black arrows (intersection directions) in FIG. 11A. That is, in FIG. 11A, a state in which the filter 26*t* (low-density portion 26*t*2) is compressed and disposed (fitted) in the opening portion 26*k*1 is illustrated two-dimensionally. However, in fact, the filter 26*t*

(low-density portion 26t2) is compressed from all quarters by contact with the substantially rectangular rim 26k10.

Figure 11B:
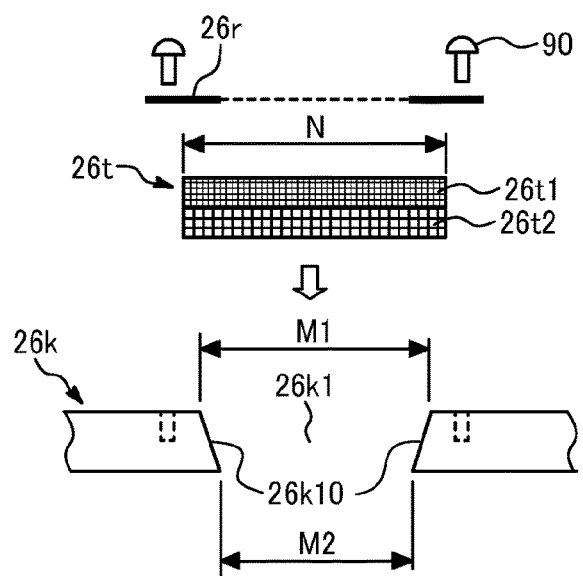
FIG. 11B is a schematic diagram illustrating a state before the filter is disposed in the opening portion of the developing device of FIG. 11A.

More specifically, as illustrated in FIG. 11B, a length N of the filter 26t in an intersection direction intersecting the communication direction is set to be larger than each of opening widths M1 and M2 (lengths in the intersection direction) of the opening portion 26k1 in a single state (N>M1>M2). As illustrated in FIG. 11A, the filter 26t is disposed in close contact with the opening portion 26k1 in a state of being compressed according to the shape of the opening portion 26k1. Specifically, although the high-density portion 26t1 of the filter 26t disposed in the opening portion 26k1 is also be compressed to some extent, the low-density portion 26t2 of the filter 26t is compressed at a high compression rate. Even in a state where the filter 26t is disposed in the opening portion 26k1 in such manner, the weight density per unit volume of the high-density portion 26t1 is higher than the weight density per unit volume of the low-density portion 26t2.

As described above, in the developing device 26 of the present embodiment, the weight density per unit volume of the filter 26t on the outside of the developing device 26 is larger than the weight density per unit volume on the inside of the developing device 26. A defect that air (discharge object) in the developing device 26 leaks together with toner (collection object) from the lateral sides of the filter 26t (between the filter 26t and the opening portion 26k1) is reduced. In the present embodiment, since the filter 26t is disposed in close contact with the opening portion 26k1, the defect that air (discharge object) leaks from the lateral sides of the filter 26t (between the filter 26t and the opening portion 26k1) together with toner (collection object) is further reduced. Accordingly, the function of the filter 26t described above is fully performed, and a defect that toner (collection object) is scattered to the outside of the developing device 26 is reduced. In particular, since the filter 26t has a portion having a low weight-density per unit volume and is easily compressed, at least the adhesion of the opening portion 26k1 in the portion is ensured. Thus, the above-described effect can be more easily obtained. The filter 26t is formed such that the weight density increases from the upstream side to the downstream side in the ventilation direction (communication direction), thus facilitating formation of the air flow from the inside to the outside of the developing device 26. Accordingly, the increase of the internal pressure in the developing device 26 can be efficiently restrained. The overall toner collection performance of the filter 26t can be enhanced, and the filter 26t is less likely to be clogged. In the state where the filter 26t is disposed in the opening portion 26k1 (actual use condition), the portion having a low weight density per unit volume (low-density portion 26t2) is compressed to increase the weight density. However, the portion having the low weight density per unit volume (low-density portion 26t2) is not be increased as much as the portion having a high weight density per unit volume (high-density portion 26t1).

In the present embodiment, the rim 26k10 in the opening portion 26k1 is formed such that the opening area in the opening portion 26k1 decreases continuously from the outside to the inside of the developing device 26 (from the upper side to the lower side in FIG. 11A). That is, the rim 26k10 is inclined (an inclined surface is formed in the rim 26k10) so as to move away from the central portion of the opening from the upstream side to the downstream side in the discharge direction (ventilation direction) in which air is discharged to the outside of the developing device 26. Such a configuration of the rim 26k10 allows the low-density portion 26t2, which is easily compressed, to be compressed at a higher compression rate. Thus, the adhesion of the filter 26t to the opening portion 26k1 can be enhanced. The filter 26t can be easily assembled from the outside of the developing device 26, and the filter 26t can be easily removed from the developing device 26. Further, the lower end of the inclination of the rim 26k10 functions as a restricting portion for preventing the filter 26t from dropping into the developing device 26.

In the present embodiment, the filter 26t is formed so as to be attached to and detached from the outside of the developing device 26 (outside the device). In the developing device 26 of the present embodiment, stoppers 26r are detachably attached to the outside of the developing device 26. The stoppers 26r contact of the filter 26t at the first side (a portion having a high weight density, i.e., a high-density portion 26t1) facing the outside of the developing device 26 so that the filter 26t does not fall out from the opening portion 26k1 (rim 26k10) to the outside of the developing device 26.

Specifically, when the filter 26t is attached, as illustrated in FIG. 11B, the filter 26t is moved from above the developing device 26 (opening portion 26k1) in the direction of the white arrow in FIG. 11B. As illustrated in FIG. 11A, the filter 26t is fitted into the opening portion 26k1. In order to prevent a defect that the filter 26t comes off upward, the stoppers 26r are fixed (screw-fastened) to the developing case (the upper developing case 26k and the lower developing case 26j) by screws 90 so as to press the filter 26t from above. In the present embodiment, a plate-shaped member having an opening inside is used as the stopper 26r. The stopper 26r is not limited to this as long as the function of the filter 26t is not impaired. As the stopper 26r, for example, a mesh-shaped member having a coarse mesh may also be used. Further, in the present embodiment, the substantially rectangular-parallelepiped filter 26t is used. The shape of the filter 26t is not limited to this. For example, the filter 26t may be formed in a quadrangular-pyramid shape so as to match with the shape of the rim 26k10 having an inclined surface.

In the present embodiment, as the filter 26t, a filter having a two-layer structure including the high-density portion 26t1 and the low-density portion 26t2 is used. On the other hand, as illustrated in FIG. 5A, a filter having a structure so that the weight density per unit volume of the filter 26t gradually increase in the direction of the arrow in FIG. 5A from the first side (facing the inside of the developing device 26) to the second side (facing the outside of the developing device 26) in a single state in which the filter 26t is not disposed in the opening portion 26k1 can be used. That is, such a filter 26t is formed such that the weight density per unit volume gradually increases along the ventilation direction (exhaust direction). Specifically, the filter 26t illustrated in FIG. 5A has a coarse and relatively fluffy state at the first side and is denser toward the second side. Such a filter 26t can be manufactured, for example, by laminating a plurality of layers having different weight densities per unit volume, as illustrated in FIG. 5B.

Sixth Variation

Figure 12:
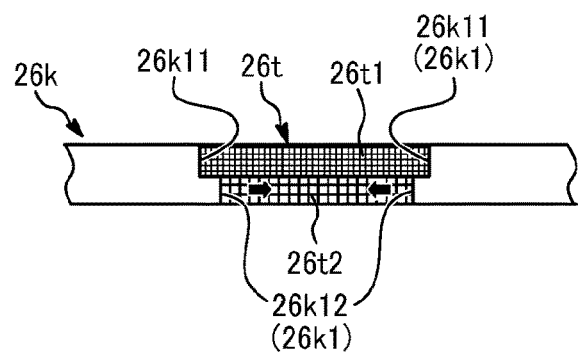
FIG. 12 is an enlarged diagram illustrating a state in which a filter is disposed in an opening portion of a developing device as a sixth variation.

As illustrated in FIG. 12, in a developing device 26 in a sixth variation, rims 26k11 and 26k12 of an opening portion 26k1 have the opening area of the opening portion 26k1 stepwise decreasing from the outside of the developing device 26 toward the inside of the developing device 26. Specifically, the opening portion 26k1 having a two-stage structure includes a first rim 26k11 having a large opening area formed at the second side facing the outside of the developing device 26 (upper side in FIG. 12) and a second rim 26*k*12 having a small opening area formed at the first side facing the inside of the developing device 26 (lower side in FIG. 12). In the sixth variation, a high-density portion 26*t*1 of a filter 26*t* is fitted to the first rim 26*k*11. A low-density portion 26*t*2 contacts the second rim 26*k*12 and is compressed in the directions of black arrows in FIG. 12. Even such a configuration can reduce a defect that air in the developing device 26 is discharged to the outside of the developing device 26 together with toner without passing through the filter 26*t*. As in the first variation, even when the rims 26*k*11 and 26*k*12 are formed such that the opening area is stepwisely decreased, similar to the case where the opening area of the rim 26*k*10 is continuously decreased as illustrated in FIG. 11A, the attaching and detaching operability of the filter 26*t* with respect to the opening portion 26*k*1 is enhanced. The step of the rims 26*k*11 and 26*k*12 restrains the filter 26*t* from dropping in the developing device 26.

Seventh Variation

Figure 13:
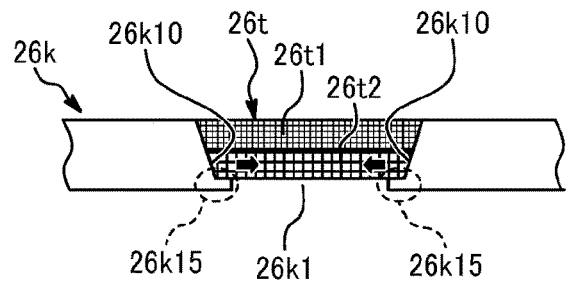
FIG. 13 is an enlarged diagram illustrating a state in which a filter is disposed in an opening portion of a developing device as a seventh variation.

As illustrated in FIG. 13, A developing device 26 in a seventh variation includes a restricting portion 26*k*15 that restricts a filter 26*t* from dropping in the developing device 26 from an opening portion 26*k*1 (rim 26*k*10). Specifically, the restricting portion 26*k*15 that protrudes in the direction of narrowing the opening is formed below the opening portion 26*k*1 (rim 26*k*10) in the developing case (the upper developing case 26*k* and the lower developing case 26*j*). The restricting portion 26*k*15 is formed such that the first side of the filter 26*t* (a portion having a low weight density, i.e., a low-density portion 26*t*2) can be contacted. Such a configuration of the restricting portion 26*k*15 can prevent a defect that the filter 26*t* disposed in the opening portion 26*k*1 drops inside the developing device 26. Further, the position of the filter 26*t* in the opening portion 26*k*1 in the vertical direction is easily be determined.

Eighth Variation

Figure 14:
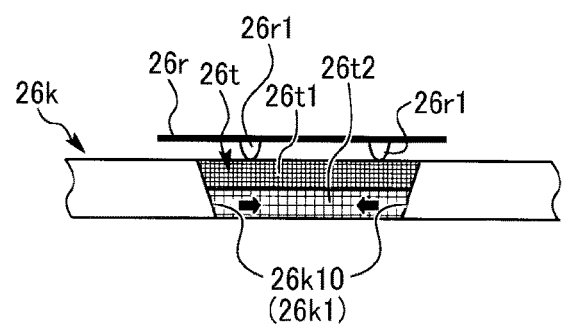
FIG. 14 is an enlarged diagram illustrating a state in which a filter is disposed in an opening portion of a developing device as an eighth variation.

As illustrated in FIG. 14, in a developing device 26 of an eighth variation, stoppers 26*r* (filter cover) are detachably attached to the outside of the developing device 26. The stoppers 26*r* contact the first side (a portion having a high weight density, i.e., a high-density portion 26*t*1) of a filter 26*t* so that the filter 26*t* does not come off from an opening portion 26*k*1 (rim 26*k*10) to the outside of the developing device 26. The stopper 26*r* in the eighth variation has a plurality of projections 26*r*1 (ribs) capable of contacting the filter 26*t* (high-density portion 26*t*1) from the outside of the developing device 26. Specifically, the projections 26*r*1 are formed so as to protrude downward from a plate-shaped portion that is not an annular plate-shaped member and not provided with a through-hole. At least four projections 26*r*1 are provided at intervals in the longitudinal direction and the lateral direction so as to press the substantially rectangular parallelepiped filter 26*t* in a well-balanced manner. The stopper 26*r* is formed such that the portions other than the plurality of projections 26*r*1 face the filter 26*t* with a gap. The air that has passed through the filter 26*t* from the inside of the developing device 26 is discharged to the outside of the developing device 26 through the gap between the stopper 26*r* and the filter 26*t*. Pressing the central portion of the filter 26*t* with the stopper 26*r* provided with the plurality of projections 26*r*1 in this way can reduce a defect that the central portion of the filter 26*t* is lifted by the air discharged from the developing device 26. The stopper 26*r* is preferably attached to and detached from the developing device 26 by a snap-on clip or the like so that only a part of the outer rims (for example, four corners) of the plate-shaped portion of the stopper 26*r* does not interfere with the exhaust from the above-described gap.

Ninth Variation

Figure 15A:
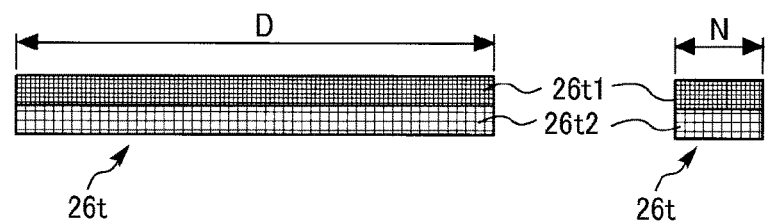
FIG. 15A is an enlarged diagram illustrating a filter in a longitudinal direction and a lateral direction thereof as a ninth variation.
Figure 15B:
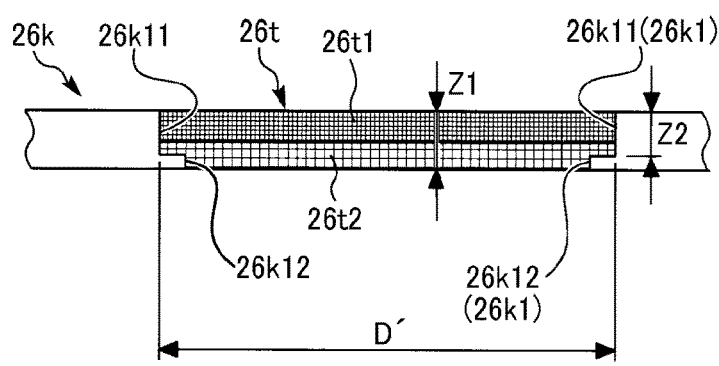
FIG. 15B is an enlarged diagram illustrating a state in which the filter is disposed in an opening portion of a developing device in the longitudinal direction as the ninth variation.

As illustrated in FIG. 15A, a filter 26*t* disposed in a developing device 26 in a ninth variation is also formed in a substantially rectangular parallelepiped shape in a single state. Specifically, in the state of a single state, the filter 26*t* has a rectangular shape, and has a thickness Z1 (thickness in the communication direction), a length D in the longitudinal direction (longitudinal direction orthogonal to the communication direction), and a length N in the lateral direction (orthogonal in the communication direction). In the ninth variation, in a state where the filter 26*t* is disposed in an opening portion 26*k*1 (developing device 26), the thickness in the longitudinal direction orthogonal to the communication direction is smaller at both ends in the longitudinal direction than the thickness in the central portion in the longitudinal direction. That is, as illustrated in FIG. 15B, when the filter 26*t* disposed in the opening portion 26*k*1 is viewed in the longitudinal direction (the direction corresponding to the vertical direction of paper surface in FIG. 2B), in the filter 26*t*, the thickness Z2 at both ends in the longitudinal direction is smaller than the thickness Z1 at the central portion in the longitudinal direction (Z1>Z2). Specifically, in the developing device 26 in the ninth variation, the opening portion 26*k*1 has a two-stage structure. A first rim 26*k*11 having a large opening width D' (which is equal to or slightly smaller than the directional length D of the filter 26*t*) is formed at the second side facing the outside of the developing device 26 (upper side of FIG. 15B) when viewed in the longitudinal direction. A second rim 26*k*12 having a small opening width is formed at the first side facing the inside of the developing device 26 (the lower side in FIG. 15B). The depth Z2 (length in the communication direction) of the first rim 26*k*11 is set smaller than the thickness Z1 of the filter 26*t* (Z2<Z1). The filter 26*t* disposed in the two-stage opening portion 26*k*1 is in a state where both ends in the longitudinal direction are pressed in the vertical and horizontal directions by the stepped portions. Even when the dimensional tolerance of the length D in the longitudinal direction of the filter 26*t* is large, both ends in the longitudinal direction are surely pressed by the above-described step of the opening portion 26*k*1 and come into close contact with the opening portion 26*k*1. Accordingly, a defect that air in the developing device 26 is discharged to the outside of the device together with toner from between the opening portion 26*k*1 and the filter 26*t* can be reduced. That is, in the ninth variation, when the filter 26*t* disposed in the opening portion 26*k*1 is viewed in the lateral direction (the direction corresponding to the left-right direction in FIG. 2B), as illustrated in FIG. 11A, the filter 26*t* is disposed in the opening portion 26*k*1 (the rim formed in a tapered shape) with the lower part compressed to the dimension M2 (<M1<N) in the lateral direction. In this way, only both ends in the longitudinal direction of the filter 26*t* are pressed in the vertical direction (thickness direction), and both ends in the lateral direction are not pressed in the vertical direction (thickness direction). This is because if the filter 26*t* in the lateral direction is pressed in the vertical direction, the degree of compression of the low-density portion 26*t*2 may be too large and the filter function may be reduced.

As described above, the developing device 26 in the present embodiment is a filter holding device in which the filter 26*t* is disposed in the opening portion 26*k*1 that communicates the inside and the outside of the developing device 26. The opening portion 26*k*1 has a rim 26*k*10 extending in a communication direction from the inside of the developing device 26 to the outside of the developing device 26. The filter 26*t* is formed such that the weight density per unit volume at the first side of the filter 26*t* is lower than the weight density per unit volume at the second side of the filter 26*t* in a single state in which the filter 26*t* is not disposed in the opening portion 26*k*1. The filter 26*t* is disposed in the opening portion 26*k*1 such that the first side is located facing the inside of the developing device 26 and the second side is located facing the outside of the developing device 26. At least a part of the filter 26*t* is compressed in the direction that intersects with the communication direction by contact with the rim 26*k*10. Specifically, in a state where the filter 26*t* is disposed in the opening portion 26*k*1, the filter 26*t* has a larger weight density per unit volume at the second side facing the outside of the developing device 26 than at the first side facing the inside of the developing device 26. Accordingly, a defect that air (discharge object) in the developing device 26 is discharged to the outside of the developing device 26 together with toner (collection object) can be reduced.

In the present embodiment, the process cartridge 20 does not include the developing device 26, and the developing device 26 is a unit that can be independently attached to and detached from the main body of the image forming apparatus 1. Alternatively, the developing device 26 may be one of the constituent members of the process cartridge 20, and the process cartridge 20 may be configured to be integrally attached to and detached from the main body of the image forming apparatus 1. In such a configuration, similar effects to those of the above-described embodiments and variations can also be attained. It is to be noted that the term "process cartridge" used in the present disclosure means a removable unit including an image bearer and at least one of a charging device to charge the image bearer, a developing device to develop a latent image on the image bearer, and a cleaning device to clean the image bearer that are united together, and is designed to be detachably attached as a united part in the body of the image forming apparatus.

In the present embodiments, the present disclosure is applied to the developing device 26 in which two conveying screws 26*b*1 and 26*b*2 (serving as the conveyors) are horizontally arranged in parallel and the doctor blade 26*c* is disposed below the developing roller 26*a*. The configuration of the developing device to which the present disclosure is applied is not limited to the above-described configurations. The present disclosure may be applied to other developing devices such as a developing device in which three or more conveyors are arranged in parallel in the horizontal direction, a developing device in which multiple conveyors are arranged in parallel in the vertical direction, and a developing device in which the doctor blade is disposed above the developing roller. In the present embodiments, the present disclosure is applied to the developing device 26 that contains the two-component developer including toner and carrier. Alternatively, the present disclosure may also be applied to a developing device that contains the one-component developer (i.e., toner, which may include additives). Such cases also provide substantially the same effects as the effects described above.

In the present embodiments, the present disclosure is applied to the developing device 26 as the filter holding device, but the filter holding device to which the present disclosure is applied is not limited to this. The present disclosure can be applied to any type of device containing powder such as toner inside, for example, the toner containers 70, the waste-toner containers 80, the cleaning devices 23, the intermediate transfer belt cleaner 81, the toner replenishment devices, and the toner conveyors. Further, in the present embodiments, the present disclosure is applied to the developing device 26 as a filter holding device configured to discharge an air as a discharge object to the outside of the developing device 26. The filter holding device (combination of the discharge object and the collection object) to which the present disclosure is applied is not limited to this. For example, the present disclosure can be applied to the main body of the image forming apparatus 1 as a filter holding device configured to collect ozone as a collection object and discharge air as a discharge object (air not containing ozone) to the outside of the image forming apparatus 1. Further, in the present embodiment, the high-density portion 26*t*1 of the filter 26*t* is configured to be largely compressed in the direction intersecting the communication direction by the inclined surface of the rim 26*k*10. The entire side surface (non-ventilated surface) of the filter 26*t* can also be configured to be compressed by the rim 26*k*10 in the direction intersecting the communication direction. A portion other than the high-density portion 26*t*1 may be configured to be compressed by the rim 26*k*10 in a direction intersecting the communication direction. If the adhesion (sealability) between the side face of the filter 26*t* and the rim 26*k*10 can be ensured, such a configuration may be adopted. Such cases also provide substantially the same effects as the effects described above.

The present embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. It is therefore to be understood that within the scope of the present disclosure, the present disclosure may be practiced otherwise than as specifically described herein. Further, the number, position, shape, and the like, of components are not limited to those of the present embodiment, and may be the number, position, shape, and the like, that are suitable for implementing the present disclosure.

This patent application is based on and claims priority to Japanese Patent Application No. 2020-169669, filed on Oct. 7, 2020, Japanese Patent Application No. 2020-169685, filed on Oct. 7, 2020, and Japanese Patent Application No. 2021-051281, filed on Mar. 25, 2021, in the Japan Patent Office, the entire disclosure of each of which is hereby incorporated by reference herein.

REFERENCE SIGNS LIST

1 Image forming apparatus
20, 20Y, 20M, 20C, 20BK Process cartridge
21 Photoconductor drum (Image bearer)
26 Developing device (Filter holding device)
26*a* Developing roller (Developer bearer)
26*j* Lower developing case
26*k* Upper developing case
26*k*1 Opening portion (Ventilation path)
26*k*10 Rim (Wall)
26*k*11, 26*k*12 Rim
26*k*15 Restricting portion
26*k*20 Protruding portion (Convex portion)
26*t* Filter
26*t*1 High-density portion
26*t*2 Low-density portion
26*r* Stopper

The invention claimed is:

1. A device comprising:
an opening to communicate an inside of the device with an outside of the device, the opening having a rim that extends in a communication direction from the inside of the device toward the outside of the device; and
a filter disposed in the opening, the filter including:
a first side facing the inside of the device; and
a second side facing the outside of the device,
wherein the filter is compressed in intersection directions intersecting the communication direction by contact with the rim so that a degree of compression on the first side is greater than a degree of compression on the second side, and
wherein the filter has a larger weight density per unit volume at the second side than at the first side in a state in which the filter is disposed in the opening.

2. The device according to claim 1,
wherein the filter has a smaller weight density per unit volume at the first side than at the second side in a single state in which the filter is not disposed in the opening, and
wherein in the state in which the filter is disposed in the opening such that the first side of the filter faces the inside of the device and the second side of the filter faces the outside of the device, the filter is compressed at the first side in the intersection directions intersecting the communication direction by the contact with the rim.

3. The device according to claim 2,
wherein the filter has a two-layer structure in which a low-density portion is disposed at the first side and a high-density portion is disposed at the second side, the low-density portion having a lower weight density per unit volume than the high-density portion, in the single state in which the filter is not disposed in the opening, and
wherein the filter is disposed in the opening in a state in which the low-density portion is compressed by the rim in the intersection directions.

4. The device according to claim 2,
wherein the rim has a shape such that an opening area of the opening continuously or stepwisely decreases from the outside of the device toward the inside of the device.

5. The device according to claim 1,
wherein the rim has a shape such that an opening area of the opening continuously or stepwisely decreases from the inside of the device toward the outside of the device.

6. The device according to claim 5,
wherein the filter has a one-layer structure having a uniform substantially uniform weight density per unit volume in an uncompressed state.

7. The device according to claim 1,
wherein in the state in which the filter is disposed in the opening, a thickness of the filter at each end in a longitudinal direction orthogonal to the communication direction is smaller than a thickness of the filter in a central portion in the longitudinal direction.

8. The device according to claim 1, further comprising:
a restricting portion to restrict the filter from dropping off from the opening to the inside of the device.

9. The device according to claim 8, wherein:
the restricting portion is in contact with the first side of the filter.

10. The device according to claim 1, further comprising:
a detachable stopper to contact the filter to prevent the filter from falling out from the opening to the outside of the device.

11. The device according to claim 10,
wherein the stopper has a plurality of projections to contact the filter from the outside of the device, and
wherein a portion of the stopper other than the plurality of projections faces the filter with a gap.

12. A device comprising:
an opening to communicate an inside of the device with an outside of the device, the opening including a rim that extends in a communication direction from the inside of the device toward the outside of the device; and
a filter disposed in the opening portion, the filter including:
a first side facing the inside of the device; and
a second side facing the outside of the device,
wherein the filter has a smaller weight density per unit volume at the first side than at the second side in a single state in which the filter is not disposed in the opening, and
wherein in a state in which the filter is disposed in the opening such that the first side of the filter faces the inside of the device and the second side of the filter faces the outside of the device, at least a portion of the filter is compressed in intersection directions intersecting the communication direction by contact with the rim so that a degree of compression on the first side is greater than a degree of compression on the second side.

13. The device according to claim 12,
wherein the filter is disposed in the opening in a state in which the filter is compressed at the second side by the rim in the intersection directions.

14. The device according to claim 12,
wherein the filter has a two-layer structure in which a low-density portion is disposed at the first side and a high-density portion is disposed at the second side, the low-density portion having a lower weight density per unit volume than the high-density portion, in the single state in which the filter is not disposed in the opening, and
wherein the filter is disposed in the opening in a state in which the high-density portion is compressed by the rim in the intersection directions.

15. The device according to claim 12,
wherein the rim has a shape such that an opening area of the opening continuously or stepwisely increases from the outside of the device toward the inside of the device.

16. The device according to claim 12, further comprising:
a restrictor to restrict the filter from falling out from the opening to the outside of the device.

17. The device according to claim 12,
wherein the rim has a protruding portion that protrudes to compress the filter at the second side in a direction intersecting the communication direction.

18. The device according to claim 12,
wherein the communication direction of the opening is substantially horizontal.

19. The device according to claim 12, further comprising:
a detachable stopper to prevent the filter from dropping off from the opening to the inside of the device.

20. A developing device to contain toner inside to develop a latent image formed on a surface of an image bearer, the developing device comprising the device according to claim 1.

21. A process cartridge to be detachably attached to a main body of an image forming apparatus, the process cartridge comprising:
the developing device according to claim 20; and
the image bearer.

22. An image forming apparatus comprising:
an image bearer;
the device according to claim 1;
a developing device to contain toner inside to develop a latent image formed on a surface of the image bearer; and
a process cartridge detachably attached to a main body of the image forming apparatus.

\* \* \* \* \*